Figure 1:
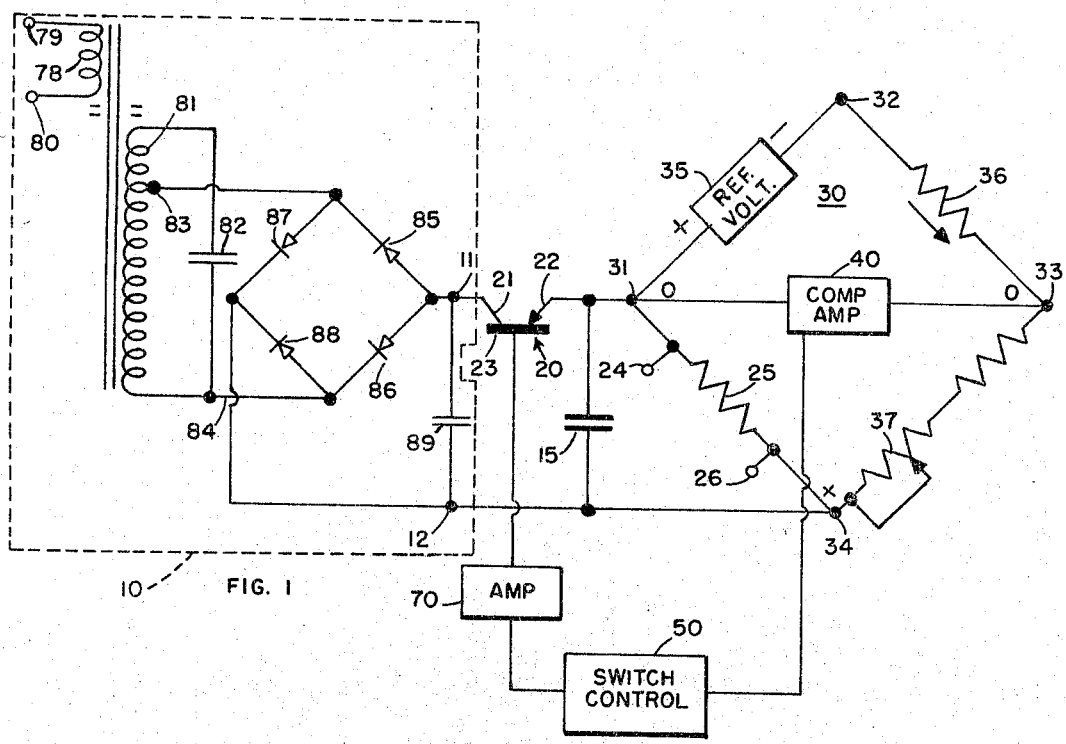

June 6, 1967     K. KUPFERBERG ETAL     3,324,378
SWITCHING TYPE REGULATED OUTPUT VOLTAGE POWER SUPPLY
Original Filed Jan. 6, 1960     2 Sheets-Sheet 1

INVENTOR.
KENNETH KUPFERBERG
AARON ROSENFELD
BY
*Alfred W. Barber*
ATTORNEYS

INVENTOR.
KENNETH KUPFERBERG
AARON ROSENFELD
BY Alfred W. Barber
ATTORNEY

United States Patent Office 3,324,378
Patented June 6, 1967

3,324,378
SWITCHING TYPE REGULATED OUTPUT
VOLTAGE POWER SUPPLY
Kenneth Kupferberg, Flushing, and Aaron Rosenfeld,
Jackson Heights, N.Y., assignors to Forbro Design Inc.,
New York, N.Y., a corporation of New York
Continuation of application Ser. No. 823, Jan. 6, 1960.
This application June 17, 1963, Ser. No. 292,811
7 Claims. (Cl. 321—18)

This application is a continuation of copending application entitled, "Switching Type Regulated Output Voltage Power Supply," filed on Jan. 6, 1960, and bearing Ser. No. 823.

This invention relates to regulated output voltage power supplies and, more particularly, to a power supply of this type incorporating a novel switching circuit for control of the output voltage within very close limits.

There are various known types of power supplies having regulated output voltages, and the type used in any particular instance will depend largely on such factors as the input power supply, the desired power capacity, the desired output voltage, and the desired sensitivity of response, among other factors. These known power supplies may be classified as to whether they are energy dissipating or energy non-dissipating. They may also be classified as to speed of response and as to whether they can operable on A.C. or D.C.

The non-dissipating types include the "motor variac" and "magamp" or magnetic amplifier voltage regulators. A typical "motor variac" type operates on A.C., and has a response time of one second, an output voltage of 115 volts A.C., and a capacity of 5 kva. The magnetic amplifier type of control operates on A.C. and has a response time of 10 to 100 milliseconds, a typical output power might be 28 volts D.C. at 50 amperes.

The dissipating types of voltage regulators include series electronic tube regulators and series transistor regulators. The series tube type of regulator operates on D.C. and has a fast response of about 50 microseconds, a typical output power of 300 volts D.C. at 500 millamperes. The series or pass transistor type of regulator also operates on D.C. and has a fast response time of as low as 50 microseconds, a typical output power of 28 volts D.C. at 10 amperes.

This circuit triggers a cascaded transistor amplifier which, in turn, triggers the pass transistor to become fully conductive or substantially non-conductive, depending upon the relative variation in the load voltage. For example, if the output voltage drops, the pass transistor remains fully conductive until the condenser voltage attains a value slightly above the desired value. Conversely, if the output voltage rises, the pass transistor remains substantially non-conductive until the output voltage drops slightly below the desired value.

Consequently, the condenser voltage is maintained at the desired value within close limits. There is very low power loss because, when the pass transistor is fully conductive, the transistor voltage drop is very small and when the pass transistor is substantially non-conductive, there is a potential thereacross but substantially no courrent flow therethrough. Due to the absence of any inductive components in the control circuitry, the opening and closing of the pass transistor "switch" is substantially instantaneous.

For an understanding of the invention principles, reference is made to the following description of a typical embodiment thereof as illustrated in the accompanying drawings.

Figures 2, 2A:
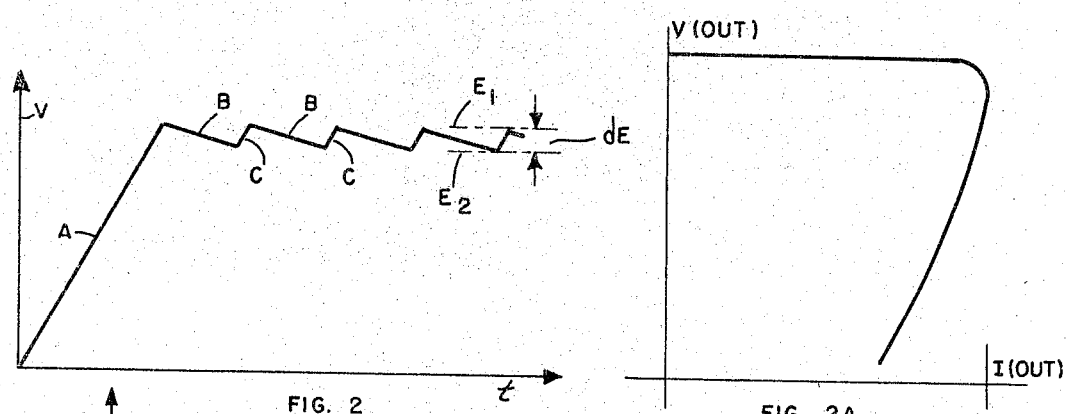
Figure 3:
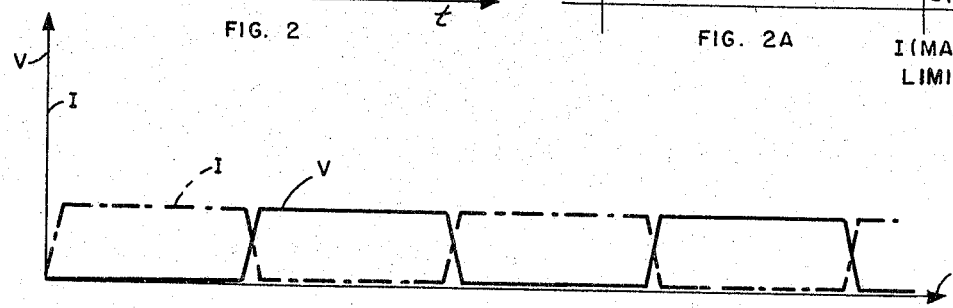
Figure 4:
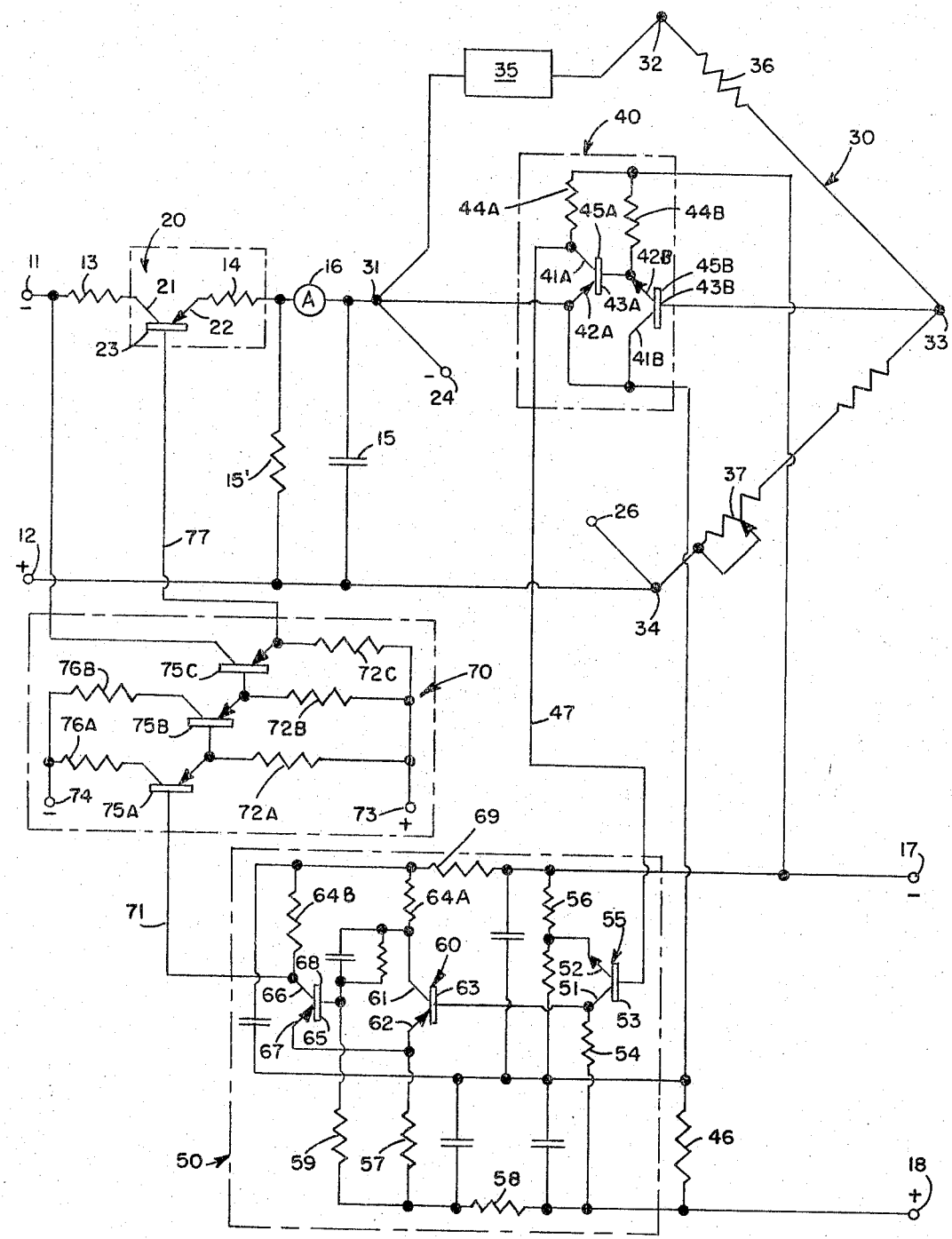

In the drawings:
FIG. 1 is a schematic block diagram of a switching voltage regulator embodying the invention;

FIG. 2 is a graph illustrating the voltage regulation characteristic;
FIG. 2A is a graph of the current from a suitable current limited source;
FIG. 3 is a voltage-current curve of the pass transistor;
FIG. 4 is a schematic wiring diagram corresponding to FIG. 1.

The same effect can be attained by using a variable resistance in series with the condenser, in place of the switch and varying such resistance to maintain the condenser potential within close limits. However, such a variable resistance will consume power at all times, whereas the switch does not. Such a variable resistance could be a rheostat, a space discharge device, or a transistor, all of which, however, dissipate power when used in such application.

In accordance with the present invention, a transistor is used as a switch in series between a substantially current limited supply and a condenser which may be connected to a load resistance in parallel therewith during use of the power supply. Novel circuitry is provided to trigger this pass transistor between fully conductive and substantially non-conductive states. More particularly, the load voltage measuring network is connected in a reference bridge, which may be a standardized or a plug-in type, including a source of fixed references potential and adjustable resistance means. Details concerning the operation of such a reference bridge are set forth in United States Patent No. 3,028,538 issued on Apr. 3, 1962.

This latter means is adjusted to a value corresponding to the desired output voltage. The network or bridge has a transistorized control or comparison amplifier connected thereacross in such manner that any variation in the voltages drop across the output terminals from the desired value is detected as to relative direction or polarity by the comparison amplifier. This variation is then suitably amplified by a transistor amplifier and used to trigger a bi-stable multivibrator, such as a "Schmitt trigger," unijunction transistor, etc.

From this it will be noted that the non-dissipating types of controls have a higher output capacity but a slower response time than the dissipating types. On the other hand, the dissipating types of control are characterized by a much faster response time but a lower output capacity. Additionally, the energy dissipating types have lower efficiency.

A highly desirable power supply having a regulated output voltage would be one combining the advantages of both types without the disadvantages of either. For example, such a supply would be substantially non-dissipating, have a response time at least as fast as that of the best dissipating type, and an output capacity at least equal to that of the non-dissipating type.

If a condenser is connected by a series switch to a constant current supply, the condenser will charge as long as the switch is closed. Also, there is substantially no voltage drop across the switch. If now the switch is opened, there is no current flow although there exists a potential across the open switch. The condenser remains charged to the voltage attained at the instant the switch was opened provided there is no load resistance connected across the condenser.

If a load resistor is connected in parallel with the condenser, however, the condenser will discharge through the resistor so that the potential across the condenser will decrease. By re-closing the switch, the condenser will recharge toward a potential determined by the control circuitry. Hence, through operation of the switch by the control circuitry, it is possible to regulate the voltage across the condenser within very close limits.

Referring to FIG. 1, a current limited source is provided comprising a flux-oscillating transformer 78-81 with line input connecting terminals 79 and 80 and oscillation tuning capacitor 82. A suitable output voltage is taken from lead 84 and tap 83 which is applied to a suitable rectifier such as bridge 85-86-87-88 and providing filtered direct current across capacitor 89 at points 11 and 12. The flux-oscillating transformer 78-81 has the well-known current limited characteristic as shown in FIG. 2A and thus, the rectified current at terminals 11-12 will have this same current limited characteristic and, as far as the balance of the circuit is concerned, may be considered a current limited source. This current limited source has been enclosed by a dash line and designated as current limited source 10. This current limited source, as has been pointed out above, provides part of a highly efficient regulated power supply, since it is not necessary to provide the more complex and costly constant current type of source.

Referring again to FIG. 1, current limited source 10 has its negative terminal connected to the collector 21 of a pass transistor 20. Emitter 22 of transistor 20 is connected to a junction point 31 of a reference network or bridge 30, and the positive terminal of source 10 is connected to junction point 34 of network 30. Junction points 31 and 34 are respectively connected to load or output terminals 24, 26 across which is connected a load schematically represented by resistance 25. In accordance with the invention, a relatively high capacity condenser 15 is connected in parallel with output or load terminals 24, 26 and is charged from source 10 through transistor 20 acting as a switch. Condenser 15 supplies the load or output voltage to terminals 24, 26.

Bridge or network 30 has two other junction points, 32 and 33. A constant reference voltage source 35 is connected between points 31 and 32, and a resistance 36 is connected between points 32 and 33. An adjustable impedance 37, used to set the output voltage at a desired pre-set value, is connected between points 33 and 34. A transistorized control or comparison amplifier 40 is connected between points 31 and 33, and its output is connected to a transistorized switching control 50 which through a transistor amplifier 70, triggers pass transistor 20 between fully conductive and substantially non-conductive states.

In the operation of the arrangement thus far described, potentiometer or variable resistance 37 is adjusted in accordance with desired output voltage. The design of network 30 is such that, when the voltage drop across resistance 25 is equal to such desired value, the series voltage drops across components 25 and 37 will equal the series voltages across components 35 and 36. There will thus be no potential difference between points 31 and 33, and thus no potential difference across comparison amplifier 40.

Referring to FIG. 2, when the source 10 is connected to the system, pass transistor 20 is immediately triggered to the conductive state due to the voltage across condenser 15 being zero, and thus less than the pre-set output voltage. The voltage across condenser 15 builds up, as indicated by the steeply sloping portion A of the curve, until the condenser voltage E-1 exceeds the desired output voltage by a small predetermined amount. At this time, pass transistor 20 is triggered to the substantially non-conductive state, and becomes an open switch.

If the load is drawing current, the condenser will slowly discharge as indicated at B until its voltage drops to the value E-2 which is a very small predetermined amount below the desired output voltage. At this voltage value, pass transistor 20 is triggered to the fully conductive state to act as a closed switch. Condenser 15 quickly charges, as indicated at C, to the voltage E-1, at which time transistor 20 is triggered to the substantially non-conductive state to open the "switch." This action continues as long as the load, or resistance 25, draws current.

The voltage change responsive action results from the comparison amplifier 40 detecting the polarity of any potential difference between junction points 31 and 33. If the output voltage exceeds the pre-set value, point 31 becomes negative relative to point 33 and vice versa if the output voltage drops below the pre-set value. In the first case, amplifier 40 triggers the bi-stable multivibrator in switch control 50 in a direction to supply a pulse which, when amplified by amplifier 70, triggers transistor 20 to the substantially non-conductive state. In the second case, transistor 20 is triggered, in a similar manner, to the fully conductive state.

Due to the pass transistor acting as an instantaneously opened or closed switch, this transistor consumes little power. Referring to the voltage and current curves of FIG. 3, it will be noted that, when the transistor is fully conductive and current is flowing therethrough, the voltage drop across the transistor approaches zero. When transistor 20 is triggered to the substantially non-conductive state, the voltage drop across the transistor is equal to the difference between the voltage of source 10 and the voltage of condenser 15, but there is no current flow through the transistor 20. The only time the transistor 20 consumes power is during the short interval, nearly instantaneous, that the voltage across the transistor is building up as the current is dropping, and vice versa. At all other times, either the voltage drop across the transistor is low or the current flow therethrough is zero, and hence little power is consumed by the transistor.

Referring now to FIG. 4, which schematically illustrates a practical embodiment of the switching regulator, the source of supply is preferably a device, such as a flux oscillating transformer, whose current output is substantially constant at its limiting value. Negative terminal 11 of such source is connected through a resistance 13 to collector 21 of transistor 20, and positive terminal 12 of the source is connected to junction point 34. Emitter 22 is connected through equalizing resistor 14 and ammeter 16 to junction point 31. The load or output terminals 24 and 26 are thus negative and positive respectively. A bleeder resistance 15' is connected in parallel with the series connection of condenser 15 and ammeter 16.

In the network 30, the constant voltage reference could be a "Zener" diode or any other suitable constant voltage device. Comparison amplifier 40 comprises a PNP junction transistor 45A and an NPN junction transistor 45B. Collector 41A and emitter 42B are connected through respective limiting resistors 44A, 44B, to the negative terminal 17 of a voltage source, and emitter 42A and collector 41B are connected through a common limiting resistor 46 to the positive terminal 18 of such source. Emitter 42A is connected to junction point 31, base 43A is connected to emitter 42B, and base 43B is connected to junction point 33. The output of amplifier 40 is taken from collector 41A by conductor 47 and applied to the base 53 of a transistor amplifier 55 in switch control 50.

Collector 51 of transistor 55 is connected through resistor 54 to positive terminal 18, and emitter 52 is connected through resistor 56 to negative terminal 17. Transistor 55 operates as a common emitter amplifier, and its collector 51 is connected to the base 63 of one of a pair of transistors 60 and 65 connected as a bi-stable multivibrator of the "Schmitt trigger" type. As will be understood by those skilled in the art, in a multivibrator of this type, when one transistor 60 is conductive, the other transistor is non-conductive, and vice versa. Collectors 61 and 66 of transistors 60 and 65 are connected through resistors 64A and 64B, and a common-resistor 69, to negative terminal 17. Emitters 62 and 67 are connected together and, through resistors 57 and 58, to positive terminal 18. Base 68 is connected through resistors 59 and 58 to positive terminal 18.

The output of bi-stable multivibrator 60-65 is taken from collector 66 by a conductor 71 and applied to the base of transistor 75A forming one of three cascade emitter follower transistors incorporated in amplifier 70. The emitters of the three transistors are connected through respective resistors 72A, 72B, 72C to positive terminal 73 of a voltage source. The collectors of transistors 75A and 75B are connected through respective resistors 76A, 76B to negative terminal 74 of this source, while the collector of transistor 75C is connected to negative terminal 11. It will be noted that the emitter of each transistor is connected to the base of the next succeeding amplifier, with a conductor 77 connecting the emitter of transistor 75C to base 23 of pass transistor switch 20.

The switching regulator operates in the following manner. Assuming that the output voltage across junctions 31 and 34 tends to exceed the pre-set value, junction point 33 will become more positive causing the base 43B of NPN transistor 45B to become more positive and causing this transistor to conduct. When transistor 45B conducts, emitter 42B becomes more positive. This causes base 43A of PNP transistor 45A to become more positive, tending to cut off this transistor and thus reducing its collector current. This reduces the voltage drop across resistor 44A, so that collector 41A goes more negative.

Correspondingly, base 53 of transistor amplifier 55 goes more negative, resulting in its collector 51 going more positive due to the decrease in collector current and thus in the voltage drop across resistor 54. The resultant more positive voltage on the base 63 of transistor 60 of the bistable multivibrator triggers this transistor to the non-conductive state, which triggers transistor 65 to the conductive state. With transistor 65 conducting, the voltage drop across resistor 64B increases so that collector 66 becomes more positive.

This more positive voltage is applied through conductor 71 to the base of transistor 75A so that a positive voltage, as amplified by the cascade emitter follower transistors 75A, 75B and 75C appears at base 23 of pass transistor 20 and triggers the pass transistor to the non-conductive state to act as an open switch. The output or load voltage thereupon decreases. When the output voltage drops to the lower limit, point 33 becomes negative relative to point 31 and, in a manner analogous to that described, pass transistor 20 is triggered to the conductive state to act as a closed switch.

While a specific embodiment of the invention has been shown and described in detail to illustrate the application of the invention principles, it will be understood that the invention may be embodied otherwise without departing from such principles.

What is claimed is:

1. A regulated output voltage power supply comprising, in combination, a current limiting flux oscillating input transformer and rectifier means connected to said transformer for providing a source of D.C. voltage to be regulated; a pair of output terminals, adapted to supply a load connected therebetween; a pass transistor in series connecting said source to said terminals; a condenser in parallel with said terminals; said transistor, when conductive, charging said condenser from said source and said condenser, discharging through the load; switch control means connected to said pass transistor and effective to trigger the latter between fully conductive and substantially non-conductive states; and a comparison network, including said output terminals, an output voltage adjusting resistance, and a reference voltage source, and means responsive to the difference between said output voltage and said adjustable reference voltage connected to control the operation of said switch control means to trigger said pass transistor to either of said states to act as an "on-off" switch to control charging of said condenser to maintain the output voltage within narrow pre-set limits.

2. A regulated output voltage power supply comprising, in combination, a current limiting flux oscillating input transformer and rectifier means connected to said transformer for providing a source of D.C. voltage to be regulated; a pair of output terminals, adapted to supply a load connected therebetween; a pass transistor in series connecting said source to said terminals; a condenser in parallel with said terminals; said transistor, when conductive, charging said condenser from said source and said condenser, when the transistor is non-conductive, discharging through the load; switch control means connected to said pass transistor and effective to trigger the latter between fully conductive and substantially non-conductive states; a comparison network, including said output terminals, an output voltage adjusting resistance, a source of reference potential, and an output voltage variation responsive means, controlling operation of said switch control means to trigger said pass transistor to either of said states to act as an "on-off" switch to control charging of said condenser to maintain the output voltage within narrow pre-set limits.

3. A regulated output voltage power supply as claimed in claim 1 including an amplifier, comprising plural cascade emitter follower connected transistors, connecting said switch control means to said pass transistor.

4. A regulated output voltage power supply as claimed in claim 1 in which said switch control means comprises a bi-stable multivibrator.

5. A regulated output voltage power supply as claimed in claim 1 in which said switch control means is a Schmitt trigger circuit.

6. In a voltage regulated power supply, the combination of, a current limited source of direct current comprising a flux oscillating transformer, a pair of load terminals for receiving connections to an external load to be supplied with regulated voltage, a reference voltage source, an adjustable reference voltage source derived from the first said reference voltage source, connections between said load terminals and said adjustable reference voltage source to compare one with the other and to provide two points across which appears any difference voltage existing between the load voltage and the adjustable reference voltage, a capacitor connected across said load terminals, a circuit for charging said capacitor from said source of direct current including a series connected pass transistor, and a circuit for charging said capacitor intermittently as long as the voltage across said load is less than the adjustable reference voltage including a comparison amplifier connected across said two points and a transistor switching circuit connected between said amplifier and said pass transistor to turn said pass transistor substantially on and off to reduce said difference voltage to substantially zero.

7. A voltage regulated power supply as set forth in claim 6 and including at least one emitter follower connected transistor in series between said transistor switching circuit and said pass transistor.

References Cited

UNITED STATES PATENTS

| | | | |
|---|---|---|---|
| 2,776,382 | 1/1957 | Jensen | 307—97 |
| 2,810,105 | 10/1957 | Henrich | 323—22 |
| 3,005,147 | 10/1961 | Thomas | 323—9 |

JOHN F. COUCH, *Primary Examiner.*

K. D. MOORE, *Assistant Examiner.*